US012488667B2

(12) United States Patent
Horrocks et al.

(10) Patent No.: US 12,488,667 B2
(45) Date of Patent: *Dec. 2, 2025

(54) METHODS FOR MONITORING SECURITY

(71) Applicant: Comcast Cable Communications, LLC, Philadelphia, PA (US)

(72) Inventors: Bill Horrocks, Media, PA (US); Doug Bassett, Fort Myers, FL (US); John Dougherty, Wynnewood, PA (US); Pritesh Patel, Hatfield, PA (US); Jim Poder, Cheltenham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,070

(22) Filed: Apr. 4, 2024

(65) Prior Publication Data

US 2024/0249608 A1 Jul. 25, 2024

Related U.S. Application Data

(63) Continuation of application No. 17/822,819, filed on Aug. 29, 2022, now Pat. No. 11,984,006, which is a continuation of application No. 17/154,346, filed on Jan. 21, 2021, now Pat. No. 11,455,876, which is a continuation of application No. 15/007,781, filed on Jan. 27, 2016, now Pat. No. 10,930,130.

(51) Int. Cl.

| | |
|---|---|
| ***G08B 19/00*** | (2006.01) |
| ***G08B 25/00*** | (2006.01) |
| *G08B 25/10* | (2006.01) |

(52) U.S. Cl.
CPC ............ *G08B 19/00* (2013.01); *G08B 25/001* (2013.01); *G08B 25/10* (2013.01)

(58) Field of Classification Search
CPC ...... G08B 31/00; G08B 25/00; G08B 25/009; G08B 29/00; G08B 21/0423; G08B 23/00; G08B 13/00; G08B 1/08; G08B 21/0469
See application file for complete search history.

(56) References Cited

U.S. PATENT DOCUMENTS 6,690,274 B1 * 2/2004 Bristol ............... G05B 23/0267 340/521
8,786,425 B1 * 7/2014 Hutz ...................... G08B 23/00 340/541

(Continued)

*Primary Examiner* — Mirza F Alam
(74) *Attorney, Agent, or Firm* — Banner & Witcoff, Ltd.

(57) ABSTRACT

Methods are disclosed that, in some aspects, provide detecting an alarm event, determining whether the alarm event is a deviation from predefined criteria, and transmitting an alert notification to users of the security system if the alarm event is a deviation from the predefined criteria. The predefined criteria may relate to the location or type of one or more sensors of the security system, the location of users of the security system, the time of day, activities within the premises, and/or behavioral patterns of the users learned by the security system. Information transmitted in the alert notification may relate to the location of one or more users of the security system, the data recorded by one or more sensors of the security system, the state of alert of the security system, and/or confidential information required to terminate the alarm event.

20 Claims, 13 Drawing Sheets

(56) References Cited

U.S. PATENT DOCUMENTS

| | | | | |
|---|---|---|---|---|
| 8,988,215 | B1 * | 3/2015 | Trundle | G08B 13/00<br>340/539.11 |
| 2007/0262857 | A1 * | 11/2007 | Jackson | G08B 13/19663<br>340/506 |
| 2009/0027196 | A1 * | 1/2009 | Schoettle | G08B 13/10<br>340/541 |
| 2012/0092163 | A1 * | 4/2012 | Hart | G08B 15/02<br>340/541 |
| 2013/0189946 | A1 * | 7/2013 | Swanson | H04W 64/006<br>455/404.2 |
| 2017/0337807 | A1 * | 11/2017 | Dey | G08B 29/185 |

* cited by examiner

METHODS FOR MONITORING SECURITY

CROSS-REFERENCE TO RELATED APPLICATIONS

This application is a continuation of and claims priority to U.S. patent application Ser. No. 17/822,819, filed Aug. 29, 2022, which is a continuation of U.S. patent application Ser. No. 17/154,346, filed Jan. 21, 2021 (now U.S. Pat. No. 11,455,876), which is a continuation of U.S. patent application Ser. No. 15/007,781, filed Jan. 27, 2016 (now U.S. U.S. Pat. No. 10,930,130), each of which is hereby incorporated by reference in its entirety.

BACKGROUND

Building security monitoring systems typically provide for an alarm when a sensor associated with the system is tripped while the system is armed. The security system will then attempt to notify one or more users of the security system to verify if the alarm was false or true. Often times such alarms are false, which can be a waste of time and resources of authorities. Existing systems do not compare the reason why the alarm was triggered to predefined criteria to determine whether an alarm is false before notifying the users and dispatching authorities. Existing systems also do not provide users of the security system information relating to why the alarm was triggered for the users to determine whether it was false or true. Existing systems also do not provide the users with efficient methods to terminate the alarm as false if needed, and do not provide users efficient access of confidential information required to terminate the false alarm. These and other shortcomings are addressed by the present disclosure.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

One or more aspects of the disclosure provide for a method that may include detecting an alarm event at a premises monitored by a security system, determining whether the alarm event is a deviation from predefined criteria, and transmitting an alert notification to users of the security system if the alarm event is a deviation from the predefined criteria. In some embodiments, the predefined criteria may relate to the location or type of one or more sensors of the security system, the location of the users of the systems, the time of day, activities within the premises, and/or behavioral patterns of the users learned by the security system.

One or more aspects of the disclosure also provide a method that may include determining the location of one or more users of the security system in relation to the premises, and transmitting information in an alert notification relating to the location of the one or more users.

One or more aspects of the disclosure also provide a method that may include detecting an alarm event at a premises monitored by one or more sensors of a security system, selecting information relating to data recorded by one or more sensors of the security system, and transmitting an alert notification to one or more users of the security system containing the selected information.

One or more aspects of the disclosure also provide a method that may include engaging a software application on a wireless device, determining a state of alert of a security system associated with the software application, selecting, based on the state of alert of the security system, an interactive graphic to display on the wireless device, and displaying the selected interactive graphic on the wireless device.

One or more aspects of the disclosure also provide a method that may include detecting an alarm event at a premises monitored by a security system, and transmitting an alert notification to a primary user of the security system that contains a link to confidential information required to terminate the alarm event.

One or more aspects of the disclosure also provide a method that may include detecting an alarm event at a premises monitored by a security system, determining the location of the alarm event, determining the state of alertness of the location that the alarm event occurred, and transmitting, based on the location of the alarm event and the state of alert of the location where the alarm event, an alert notification to one or more users of the security system.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
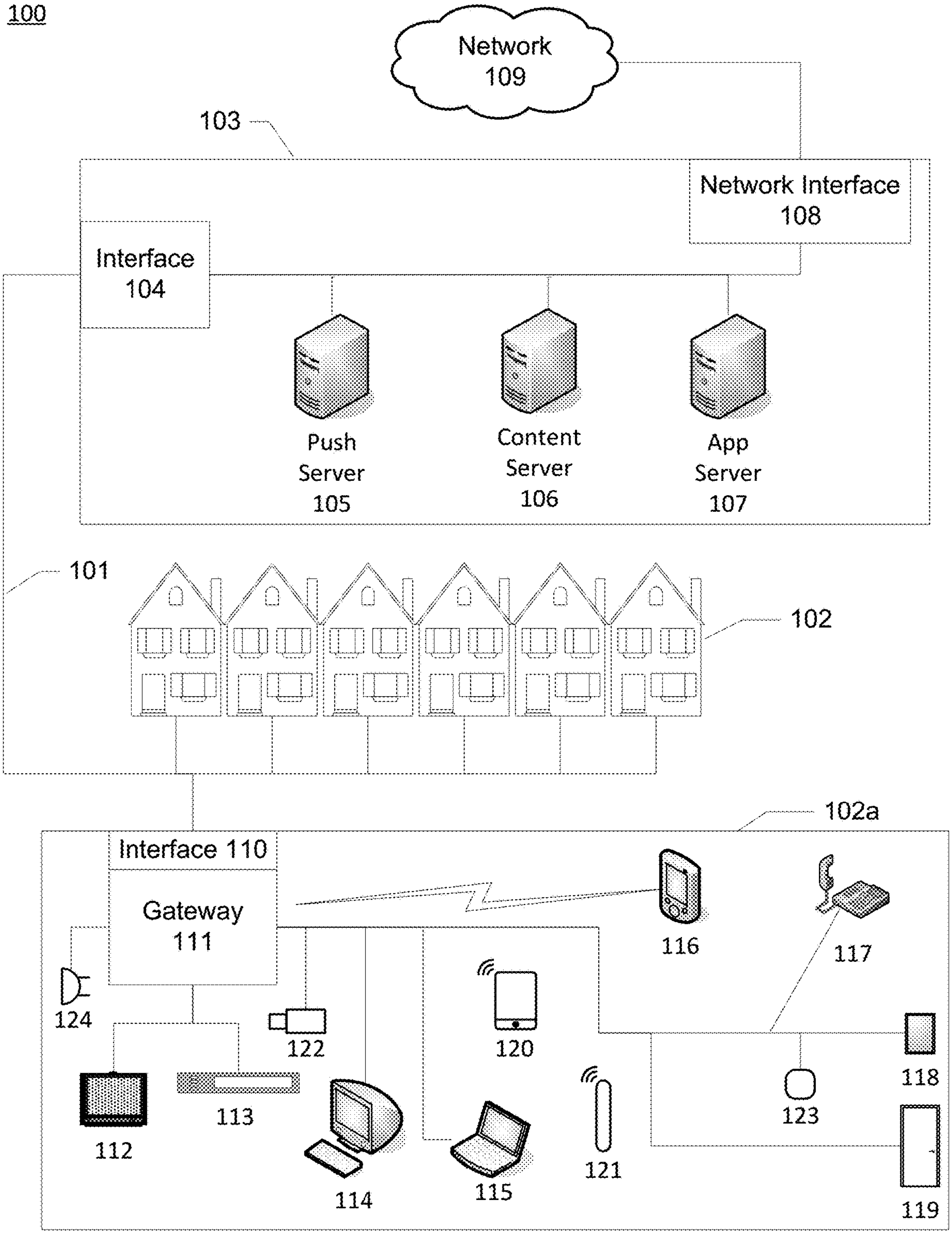
FIG. 1 illustrates an example information access and distribution network that may be used to implement one or more aspects as described herein.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc., and/or other types of devices such as tablets, cell phones, laptops, and/or computers, etc.) to a local office 103 (e.g., a headend, a processing facility, a local exchange carrier, a gateway, a network center or other network facility, etc.). The local office 103 may transmit downstream information signals onto the links 101, and each premises 102 may have one or more receivers used to receive and process those signals.

There may be one or more links 101 originating from the local office 103, and it may be split a number of times to distribute the signal to various premises 102 in the vicinity (which may be many miles) of the local office 103. The links 101 may include components not illustrated, such as splitters, filters, antennas, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications, including for example, security system 319 and/or various wired and/or wireless devices). The local office 103 may also include a content server 106. The content server 106 may be one or more computing devices that are configured to provide content to users in the homes. This content may be, for example, video on demand movies, television programs, songs, services, information, text listings, security services, etc. In some embodiments, the content server 106 may include software to validate (or initiate the validation of) user identities and entitlements (e.g., for example, to execution of various functions in the security system), locate and retrieve (or initiate the locating and retrieval of) requested content including security footage, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service (e.g., security system services and applications), and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102. Another application server may perform various security system functions including storing remotely security camera footage, storing past event history, storing security system criteria, and storing credentials to enable remote operation, control, alarm shutoff, and other security system related functions.

An example premises 102*a* may include an interface 110 (such as a modem, or another receiver and/or transmitter device suitable for a particular network (e.g., a wireless or wired network)), which may include transmitters and receivers used to communicate on the links 101 and with the local office 103. The interface 110 may be, for example, a coaxial cable modem (for coaxial cable lines 101), a fiber interface node (for fiber optic lines 101), a wireless transceiver, and/or any other desired modem device. The interface 110 may be connected to, or be a part of, a gateway interface device 111. The gateway interface device 111 may be a computing device that communicates with the interface 110 to allow one or more other devices in the home and/or remote from the home to communicate with the local office 103 and other devices beyond the local office. The gateway 111 may be a set-top box (STB), digital video recorder (DVR), computer server, security system, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, home security system 319, tablet computers 120, personal activity sensors 121, video cameras 122, motion detectors 123, microphones 124, and/or any other desired computers, sensors, such as ambient light sensors, passive infrared sensors, humidity sensors, temperature sensors, carbon dioxide sensors, carbon monoxide sensors, and others. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, ZigBee interfaces and others.

Figure 2:
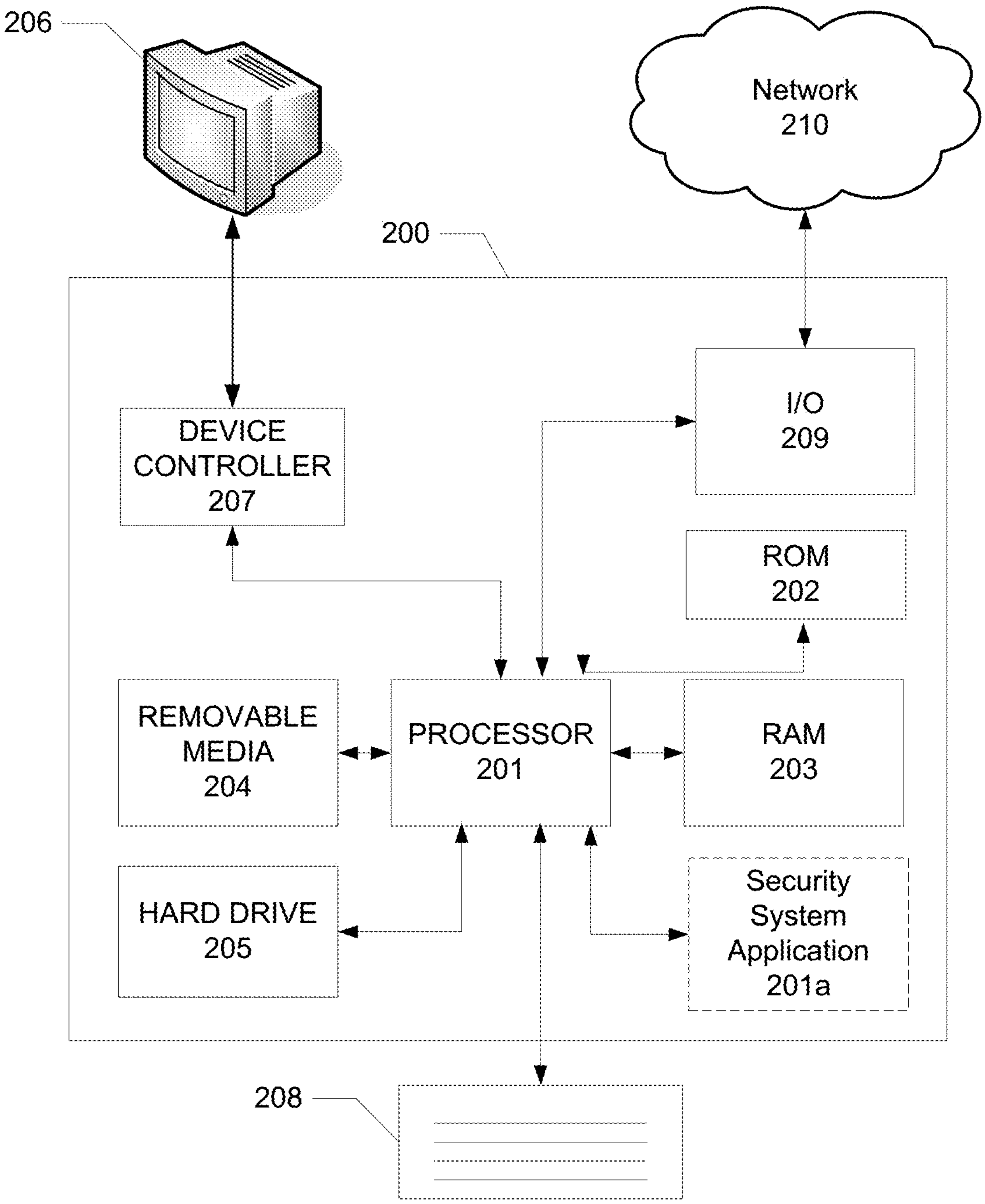
FIG. 2 illustrates an example computing device that may be used to implement one or more aspects as described herein.

FIG. 2 illustrates general hardware elements of an example computing device 200 that can be used to implement one or more aspects of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include security system 319 and/or any associated application 201*a* which may enable the device to perform the steps, methods, algorithms and/or flows described herein.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
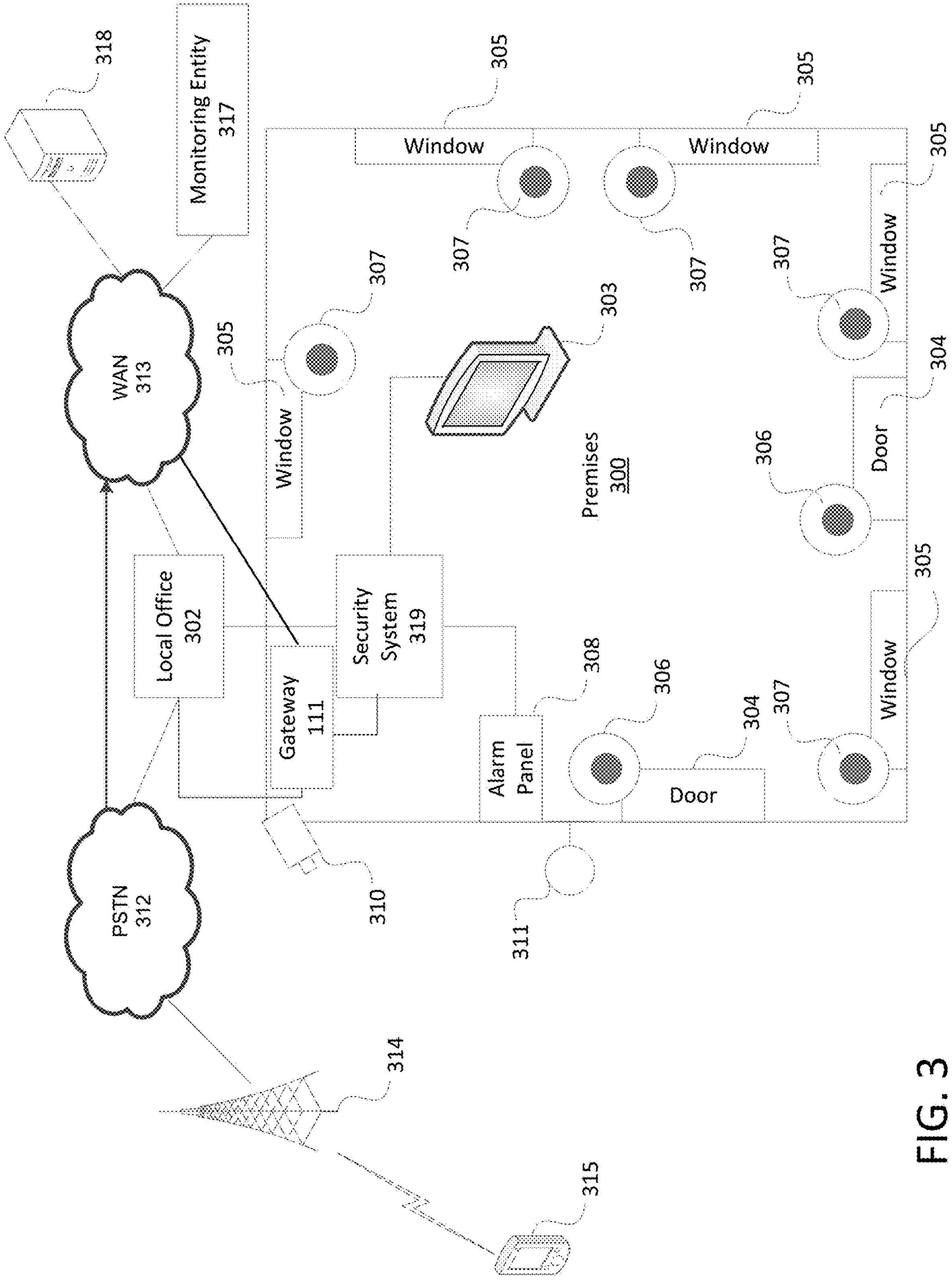
FIG. 3 illustrates an example operating environment in which one or more of the various features described herein may be implemented.

FIG. 3 is a diagram showing an example operating environment in which various features described herein may be performed and implemented. The environment may include premises 300 (which may correspond to premises 102 of FIG. 1), such as a user residence, business, recreational facility, etc. (referred to herein as a user residence or premises in a non-limiting manner), and a local office 302 (which may correspond to the local office 103 of FIG. 1). The premises 300 may include one or more doors 304 and a plurality of windows 305. The doors 304 may be secured by one or more associated door security sensors 306. In addition, each of the plurality of windows 305 may be secured by associated window security sensors 307, which may be similar to the door security sensor 306. The security sensors 306 and 307 may be communicatively coupled to a security system 319 (which may correspond to the home security system 119 of FIG. 1), which may allow the security sensors 306 and 307 to be armed, disarmed and monitored. Security sensors may be a number of different sensors for collecting data, such as video cameras, microphones, ambient light sensors, passive infrared sensors, humidity sensors, temperature sensors, carbon dioxide sensors, carbon monoxide sensors, or the like. In one arrangement, an alarm panel 308 may be implemented in, in proximity to, and/or as part of security system 319. A user may operate alarm panel 308 to arm security sensors such as sensor 306, such that if a door 304 is opened while the associated security sensor 306 is armed, an alarm may be triggered. Herein, triggering an alarm may result in various actions, for example, playing an alarm sound, presenting an alarm message, turning on/off lights, turning on cameras, etc. In the event an alarm is triggered, the security system 319 may be configured to compare the reason why the alarm was triggered to predefined criteria to determine whether an alert notification should be sent to users of the security system. In accordance with embodiments discussed herein, the predefined criteria may be user defined or based on behavioral patterns of the users learned by the security system. For example, the user may indicate that alarms triggered by certain individuals identified by facial recognition do not actually trigger an alarm. For example, if a person's grandmother or grandfather enters the house, and the security system recognizes them through facial recognition or other biometric parameter, an alarm may not be triggered; alternatively, under predefined conditions such as this, a message is sent to the mobile device of the premises to determine next steps. Further, if a child comes home at 3:00 every day and forgets to turn off the alarm, certain conditions may be set to notify a mobile device before sounding an alarm. Other examples are discussed in more detail herein.

In one arrangement, security system 319 and/or alarm panel 308 may be implemented in computing device 200, for example, with many functions disclosed herein implemented by security system application 201*a*.

In another arrangement, security system 319 and/or alarm panel 308 may be implemented as part of gateway 111 (FIG.

1). Thus, in one example, gateway 111 may be communicatively coupled to security sensors 306 and 307, which may allow gateway 111 to arm, disarm, and/or monitor the security sensors 306 and 307. While the description above focuses on door security sensors 306 and window security sensors 307, many other security sensors and devices may be communicatively coupled to security system 319 and/or gateway 111. For example, the security system 319 may be communicatively coupled to one or more cameras 310, which may record video to monitor the premises 300 and surrounding area.

One or more cameras 310 or sensors may be located so as to monitor an access location of the premises 300, such as a door 304 or a window 305, or other traffic areas of premises 300. According to various techniques disclosed herein, images, sounds, and other data captured by a camera 310 or other sensors of may be transmitted by the security system 319, for example, as an email, text message, or through a software application to, for example, a remote or local user or device, for analysis and/or a predetermined and/or dynamically determined action.

One or more lights 311 may be located so as to illuminate an access location of the premises 300, such as a door 304 or a window 305, or other traffic areas of premises 300. According to various techniques disclosed herein, the alarm system 319 may control the light 311 to provide illumination as part of providing an alarm triggered by the security sensors.

From the example diagram of FIG. 3, various features may be realized. For example, the security sensors 306 and 307, cameras 310, light 311, alarm panel 308, and security system 319 may be communicatively coupled to a user interface device, such as the television 303 (or another type of display). Through the user interface device (e.g., the television 303, a tablet 120 and/or wireless device 116) an authorized user may configure any of the devices within the security system. Another example feature may include transmitting (e.g., streaming) data (e.g., pictures, video, audio, etc.) from one or more cameras 310 to any of the other devices in the diagram of FIG. 3.

FIG. 3 also shows that the security system 319 may communicate with an external network, such as the local office 302. Thus, the security system 319 may transfer alert signals or alert notifications indicating detected alarm events upstream to the local office 302. This may be particularly desired to counter "smash and grab" scenarios in which an intruder smashes devices of the security system (e.g., alarm panel 308, camera 310, security sensors 306 and 307, etc.) in hopes of disabling the alarm event or preventing recording of the alarm event. In a smash and grab scenario, the security system 319 may transfer alert signals or notifications upstream to the local office 302 so that the authorities can be alerted and/or data regarding the alarm event can be captured before the security system is disabled.

Referring to FIG. 3, when an alarm event is detected, the local office 302 may record the alarm event (e.g., store information identifying the sensor(s) that were tripped, their location, recording video and/or audio showing the event that occurred, etc.), determine an appropriate reaction, and/or transmit a signal to an external network, such as the public switched telephone network PSTN 312, network 101, network 109, and/or a wide area network WAN 313. In one embodiment, the security system 319 may communicate directly and/or indirectly with networks 101, 109, 312 and/or 313. An example of such a connection is a connection between security system 319, local office 302, and/or PSTN 312, may be configured to send data in a suitable form such as alert notifications to a cell tower 314 and/or other suitable network and ultimately to one or more designated wired and/or wireless devices 315 (e.g., smartphone, tablet, etc.). Alert notifications from the local office 302 may be sent to one more designated cellular devices 315 in the form of a direct and/or indirect communication such as an email, text message, or phone call or through a software application. Also, through the PSTN 312, the local office 302 may connect to a public safety answering point (PSAP). Thus, the local office 302 may alert authorities of the alarm, so that the authorities may be dispatched to the premises 300.

Additionally, or alternatively, the local office 302 may transfer an alert signal via one or more networks such as the WAN 313 (e.g., the Internet) to a monitoring entity 317 and/or a web portal server 318. The monitoring entity 317 may be the same entity as the local office 302 or a third party entity. Regardless, the monitoring entity 317 may be responsible for monitoring the premises 300. This may include responding to alert signals received when the security system detects an alarm event. For example, the monitoring entity 317 may immediately contact the appropriate authorities to dispatch them to the premises 300. Or, when an alert signal is transferred to the monitoring entity 317, this may prompt a representative or automated system of the monitoring entity 317 to contact (e.g., via a call, e-mail, text, and/or application) the premises or another designated entity (e.g., via a telephone number and/or other contact designation) to confirm the correctness of the alarm event and/or desired response to the alarm event. Also, the monitoring entity 317 may be send alert notifications to one more designated wired and/or wireless devices e.g., 315, 116, 120 in the form of a communication such as an email, text message, phone call and/or through a software application.

Meanwhile, the web portal server 318 may be a computing device capable of providing a web portal through which users may view, on any connected display device, information regarding the security of the premises 300. Users may log-on and/or gain access to the web portal provided by, for example, the web portal server 318 and view an alarm event and/or information related to an alarm event, such as what sensor was triggered and when it was triggered and/or associated dated related to the alarm event. Also through for example, the web portal, a user may be able to view video of the premises 300 captured by the camera 310 and/or may be able to check the status of the security system, to see if it is armed. Where the web portal server 318 is coupled to a suitable network such as WAN 313 (e.g., the Internet), the web portal for the premises 300 may be accessed using any device that can connect to the network, such as a smartphone, tablet, laptop, etc. The web portal may also be used to customize settings, such as schedules, to indicate when and how the security system should operate. For instance, using the web portal, a user may be able to indicate certain times during which the security system should automatically arm/and or disarm itself. The web portal may be coupled to the user's calendar either at work and/or on his or her phone and provide additional inputs to the arming and/or disarming of the security system. Additionally, the security system and/or web portal may use these inputs to determine that a user is outside of the premises and has not set his security system.

In some embodiments, the web portal may permit a user to view multiple premises 300. That is, a single interface may allow a user to view status information, video, security settings, etc. for a plurality of premises 300. In some cases, such information may be viewed simultaneously on the web portal. Having a single interface may be desirable to users who have multiple security systems at various remote locations, such as users who own multiple homes or businesses.

In some embodiments, the local office 302, monitoring authority 317, and/or security system 319 may communicate with multiple users of the security network. For example, the security network may consist of one or more primary users and one or more secondary users, such as family users or other individuals likely to be in the premises 300 on a regular basis. The primary user may designate what family users or other individuals to include in the security network. Other individuals may include members of the primary users' social network, such as neighbors and friends, etc. The primary user and the secondary users, if given authorization, may communicate with the local office 302, the monitoring entity 317 and/or the security system 319, for example, via a software application in their designated cellular devices 315.

In some embodiments, the security system 319 may be configured to confirm the location and identify of the users of the security network or other individuals in premises 300 to carry out the embodiments discussed herein. The security system 319 may employ several known techniques for doing so. For example, the security system 319 may determine the location of each user in the security network based on GPS location of each member's cellular devices 315, using Bluetooth or WiFi-based location, or other known methodologies. The security system 319 may also verify the identity of each user in the security network within premises 300 using several known person recognition techniques, including for example, known key code, voice recognition, facial or pattern recognition, and body-mass recognition, fingerprint recognition, retina scanner recognition, based on data collected from cameras, microphones, infrared sensors, biometric sensors, and/or any other desired sensors (e.g., using a cell phone/tablet microphone, camera, fingerprint scanner). Further, the biometric information may also be used to verify that the user is not under duress when he and/or she clears the alarm event. For example, the surrounding area may be scanned and/or the biometrics (including biometrics from a wearable device) may be configured to detect distress in the user attempting to deactivate the alarm notification.

In some embodiments, when an alarm event is detected, local office 302, monitoring authority 317, and/or security system 319 may transmit information regarding the alarm event to one or more users to help them better understand the scenario that triggered the alarm. For example, information about an alarm event may be transmitted to one or more mobile devices 315, 116, 120 and/or via the web portal server 318, identifying the sensor(s) that were tripped, when they were tripped, their location, recording video and/or audio showing the event that occurred, the locations of other individuals in the home or business premise, etc. The user and/or a predefined user configurable response application may be able to use such information regarding the alarm event to determine whether the alarm is a false alarm or whether authorities should be notified and dispatched.

In some embodiments, local office 302, monitoring authority 317, and/or security system 319 may transmit information giving one or more users the option to clear the alarm event as a false alarm. For example, information may be transmitting to the user's cellular devices 315 or via web portal server 318 enabling the user to disarm the notification and providing access to a confidential passphrase and/or other biometric identification discussed herein, which may be input when the local office 302 and/or monitoring entity 317 makes contact to verify the user, the fact that the user is not under distress, and the user's decision to disarm the notification.

Figure 4A:
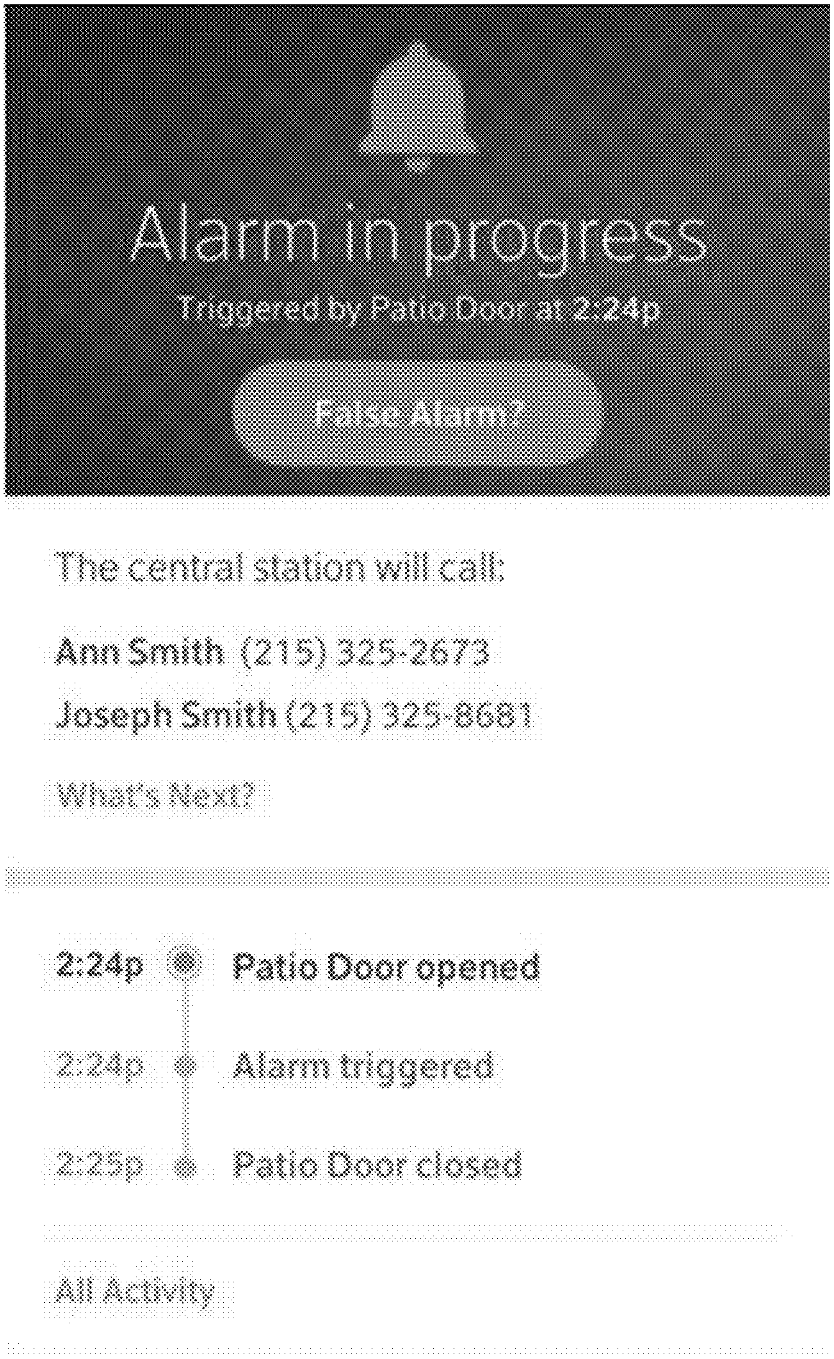
FIGS. 4A, 4B, 4C, 4D, and 4E illustrates an examples of graphical display on a wireless device in accordance with one or more aspects as described herein.
Figure 4B:
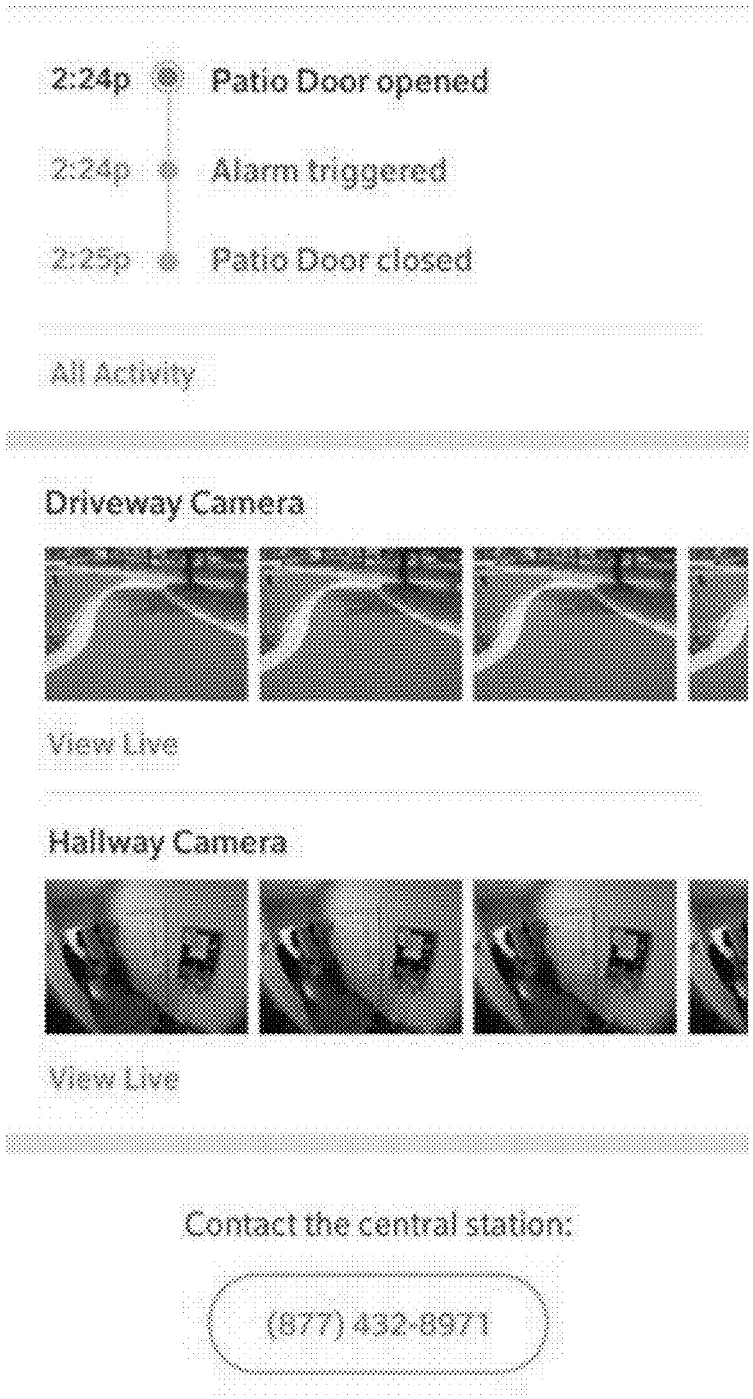
Figure 4C:
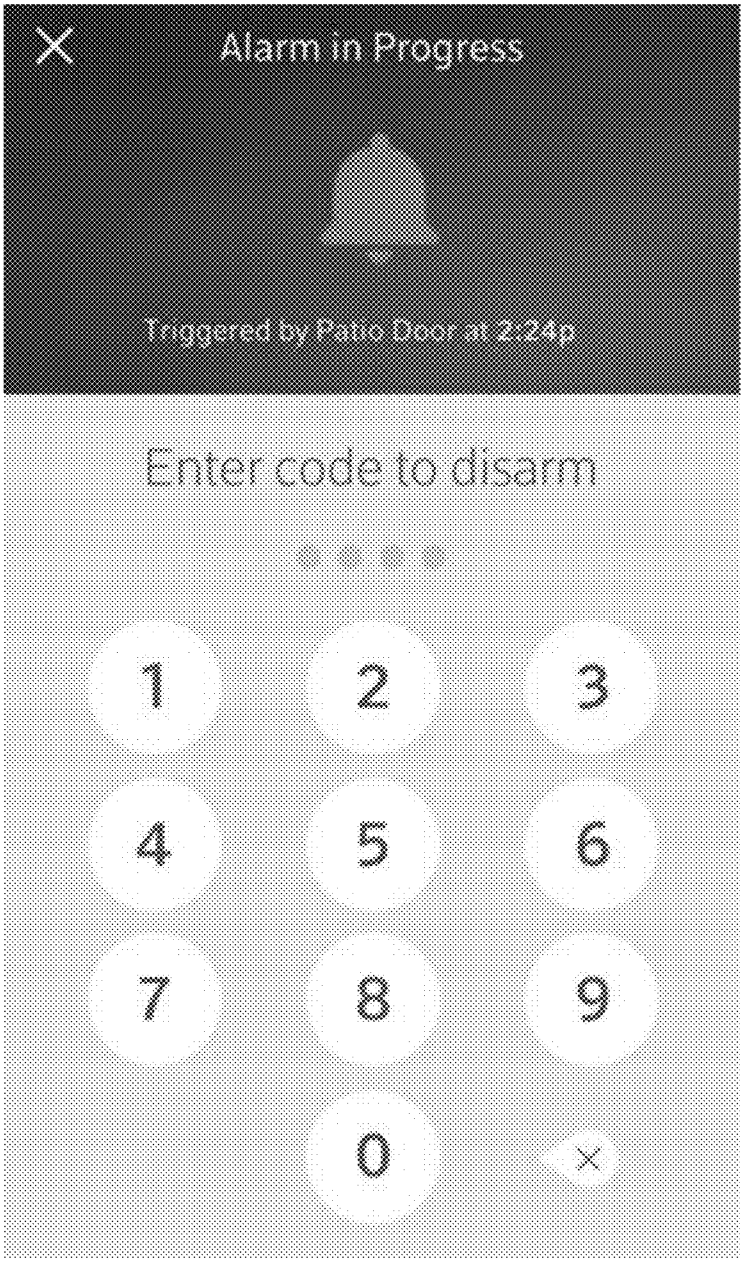
Figure 4D:
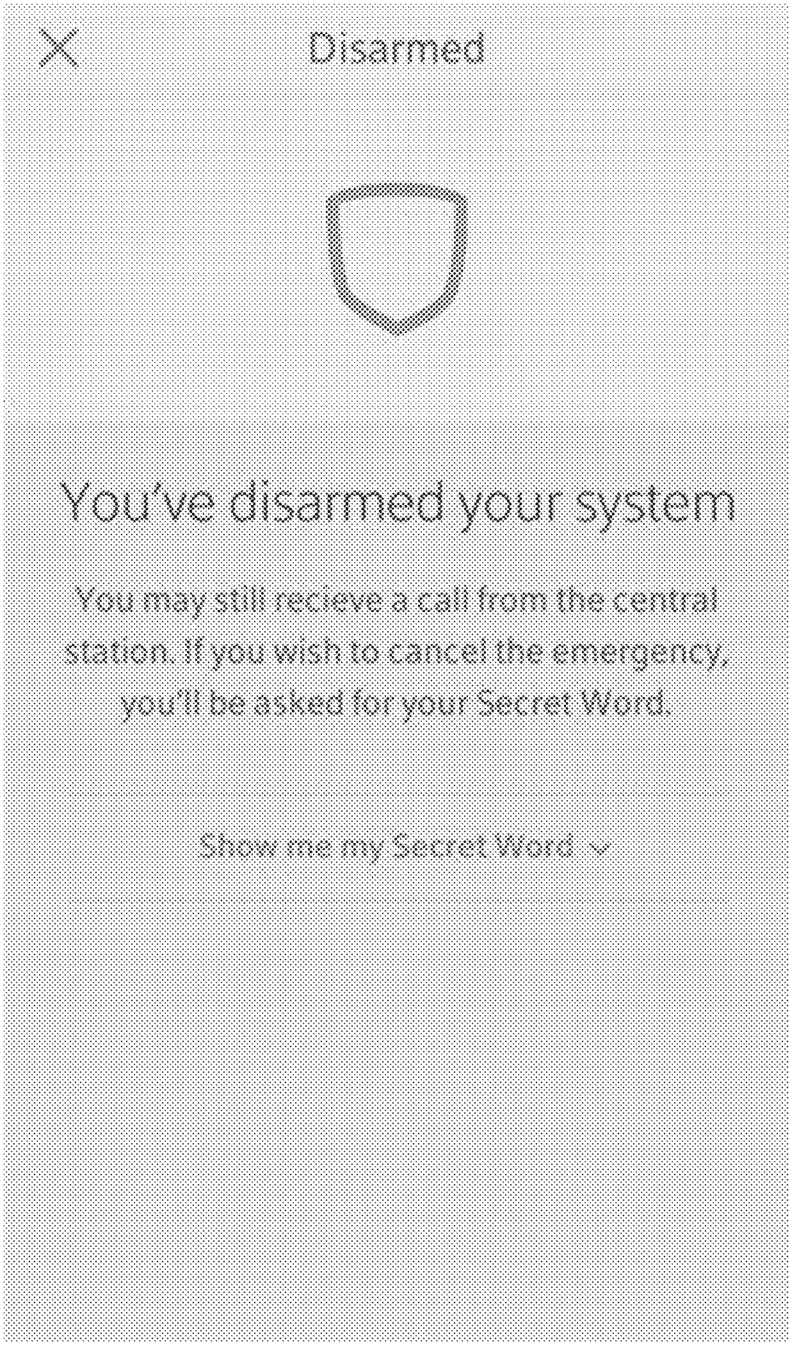
Figure 4E:
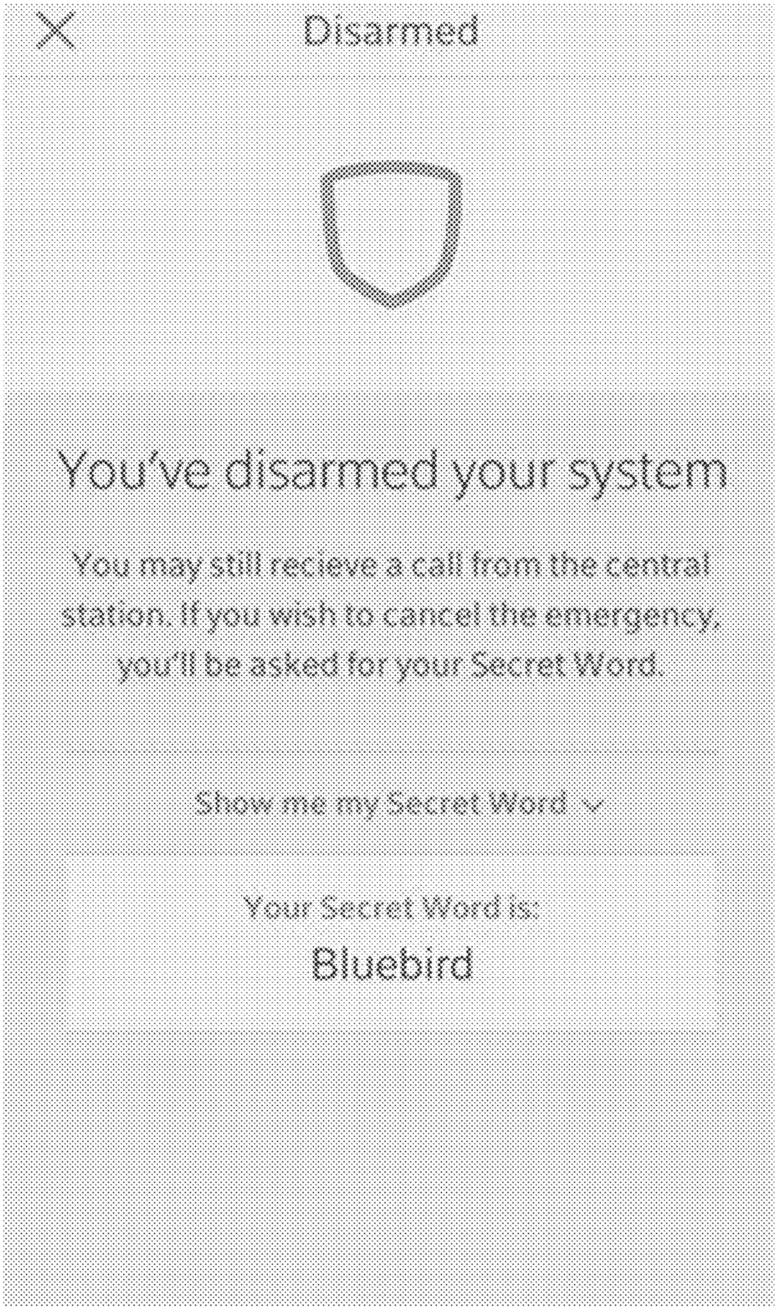

FIGS. 4A, 4B, 4C, 4D, and 4E illustrate exemplary notifications which may be sent to and/or displayed on a user's devices (e.g., wireless devices 315, 116, 120, 117) via any suitable mechanism such as a software application. The notification may include a description of the alarm event, as for example depicted in FIG. 4A and FIG. 4B. The description may identify the sensor(s) that were tripped, when they were tripped, their location, recording video and/or audio showing the event that occurred, or other information about the alarm event. For example, the user may scroll through the various alarm event related information by swiping left, right, up and/or down on the mobile device (where a mobile device is used). The notification may also give the user the option to clear the event as a false alarm, as depicted in FIG. 4C. Although pin pad entry is shown, other entry may be appropriate such as a biometric entry discussed elsewhere herein. Choosing the option to clear the notification as a false alarm may require entry of a confidential passcode, as depicted in FIG. 4C and/or other biometric entry. Successful entry of the user's passcode and/or other biometric criteria may clear the alarm and may authenticate access to the user's confidential passphrase. The confidential passphrase may be needed when the local office 302 or monitoring authority 317 contacts the user to verify the user and the user's decision to disarm the notification. In some circumstances, an operator is not required to place the call. For example, certain criteria may trigger a fully automated response. In other circumstances where the alarm was of a certain nature (e.g., unrecognized intruder), the system may trigger a human interaction and/or a different notification to the user and/or an alarm. In some embodiments, the confidential passphrase may be hidden initially and exposed only if the user needs a reminder of the confidential passphrase, as depicted in FIG. 4D and FIG. 4E. In some embodiments, the reveal may require biometric authentication. Additionally, or alternatively, other methods of authentication may be provided to the user so that the user can clear the alarm. For example, in addition to or in lieu of providing access to the confidential passphrase, a notification may be sent to the user (e.g., via wireless device 315, 116, 120) providing access to a confidential question of the day, passphrase reminders, or the like.

In some embodiments, alert notifications to users of the security network may be tailored depending on their location in relation to premises 300. For example, if an alarm event is detected, and the security system 319 determines that one or more of the users of the security network is within 5 miles of the premises 300, then alert notifications may be sent to such users directing them to stay away from the premises 300 until the alarm event has been cleared. In another example, if an alarm event is detected, then the system may determine the location of the users of the security network so the alert notification sent to the primary user may contain information about the locations of other users of the security network. The notification to the primary user may (either optionally at the primary user's discretion and/or in response to configuration parameters) may send one and/or selected other users of the security network notifications depending on the nature of the alarm event. For example, if the notification sent to the primary user indicates an intruder in the premises 300, then the system may be configured to and/or the primary user may choose to send alert notifications to all and/or selected users of the security network near the premises 300 stay away until the alarm event has been cleared. Additionally, or alternatively, if the alarm is active and one or more users of the security network are shown to be in the premises 300, the primary user may determine that a user in the security network inadvertently triggered the alarm, in which case (e.g., after review of internal security footage and/or communication with the individual in the premises), the primary user may clear the event as a false alarm, as described in embodiments above. Also, the primary user may have the option to send the confidential passphrase, described in embodiments above, to one or more devices (e.g., devices 315, 120, 116) of one or more of the individuals determined to be in the premises 300 so they can use the passphrase in the event local office 302 or monitoring entity 317 calls to verify the decision to disarm the notification. This pass phrase may be a static or semi-static pass phrase and/or a pseudo random pass phrase generated by the security system 319 and/or the monitoring entity 317. The primary user may send the confidential passphrase to the devices (e.g., 315, 120, 116) of other users of the security network via SMS message, email, software application, or other known method. In some embodiments, before the primary can send the confidential passphrase to other users of the security network, the primary user may be required to authenticate himself or herself to the local office 302 and/or monitoring entity 317, such as by entry a confidential passcode as depicted in FIG. 4C and/or with a biometric authentication.

In some embodiments, in the event the primary user chooses to provide other users of the security network with the confidential passphrase, an added level of security may be implemented whereby the other user(s) receiving the passphrase may have to verify that he or she is correctly in the premises 300 before the local office 302 or monitoring entity 317 permits the other user(s) to receive the passphrase. Such verification could be done several ways, including but not limited to, the system may listen for the audio signature of the siren within the premises 300, the cellular devices 315 may actively engage a Quick Response code or infrared beacon within the premises 300, the local office 302 or monitoring entity 317 could verify the other user's image on one of the internal cameras within the premises 300, or the local office 302 or monitoring entity 317 could ask the other user(s) a series of specific question only known to someone that is inside the premises 300.

In other embodiments, the security system 319 may use predetermined criteria to determine when an alarm should be triggered in order to reduce the amount of false alert notifications. In other words, an alarm event in security system 319 may be triggered only when there is a deviation from a predefined set of criteria. In some embodiments, the primary user may set certain criteria for what is considered an alarm event and when notifications should be sent. Predetermined criteria could include, for example, the location of users of the security network in relation to the premise 300, the time of day, the location of sensors within the premises 300, images on a camera, internal and/or external sensors, etc. The predetermined criteria can apply to one or more sensors within premises 300, and may include a combination of sensor data. For example, security system 319 may be configured to trigger an alarm event only if no users of the security network are within premises 300. In another example, the security system 319 may be configured to trigger an alarm event only if the body mass of a suspected intruder is larger than a predetermined value (e.g., larger than a pet that resided in the premises 300). For example, the user may be able to enter their pet's approximate weight and/or a picture showing the pet. The security system could then verify the triggering event was triggered by a pet via an analysis of infrared detector data and/or camera feed data. In another example, the security system 319 may be configured so that no alarm events are triggered when a user in the security network comes within a predetermined distance of the premises 300 during a specific time of day (e.g., returning from work).

In some embodiments, the local office 302, monitoring authority 317, and/or security system 319 may be configured to cancel an alarm event, send an alarm notification to one or more users, or notify and dispatch authorities after determining a confidence level that a triggering event is likely a real alarm and likely not a false alarm. For example, local office 302, monitoring authority 317, and/or security system 319 may be configured to determine a confidence level by analyzing information relating to the triggering event and comparing the information to predefined criteria. Information about the triggering event may include, for example, information relating to the sensor(s) that were tripped, when they were tripped, their location, recording video and/or audio showing the event that occurred, the locations of other individuals in the home or business premise, etc. If the local office 302, monitoring authority 317, and/or security system 319 determines that the confidence level is greater than 50%, for example, then an alarm notification may be sent to one or more users, and/or authorities may be notified and dispatched. If the local office 302, monitoring authority 317, and/or security system 319 determines that the confidence level is lower than 50%, for example, then the local office 302, monitoring authority 317, and/or security system 319 may terminate the alarm event, and/or send a notification informing them of the triggering event and the confidence level that the triggering event is likely false. In accordance with embodiments discussed herein, the local office 302, monitoring authority 317, and/or security system 319 may also provide one or more users information about the triggering event so that they may independently confirm whether or not the triggering event is false alarm.

The security system 319 may also be configured to group or characterize sensors of the premises 300 into different zones depending on their location within premises 300. The security system 319 may then be configured to set the zones to a different state of alert. In other words, users of the security system 319 may have the ability to set or change the state of alertness of each zone within the security system 319. For example, if no user in the security network is likely to be in the lower level of the premises 300 at night, then the state of the lower level may be set to trigger an alarm event upon any activity within the lower level. Similarly, if most of the users of the security network remain in the upper level of premises 300 at night, then the upper level may be set to trigger an alarm event only if an alarm is initiated manually or triggered from a perimeter sensor such as an outdoor, window, and/or door sensor. With this example, if an inside sensor on the upper level of premises 300 is tripped before a lower level sensor and no windows were opened or broken on the lower level, then the security system 319 may not trigger an alarm event since the probability of an intruder is extremely low.

In some embodiments, the security system 319 may be configured to learn the behavior of activities of the users of the security network and or other residents of premises 300, such as children and pets, in order to adjust alarm settings or modes and to determine when an alarm should be triggered. The security system 319 may be configured to learn by software stored, for example, on the RAM 203 or other appropriate memory or storage device in the computing device 200. The learning process may include, for example, monitoring the activities of users of the security network and other individuals within the premises 300 based on the time of the date and day of the week, any calendar entries, etc. For instance, one or more users of the security network may regularly enter the premises 300 at particular time of day (e.g., arriving home from work, and/or maid arrival). The security system 319 may keep track of the users' interaction with the alarm system and perform steps for the users, without the users' request. Continuing the example, if the security system 319 determines that a specific user in the security network routinely opens a garage door at 5 pm, then the security system 319 may automatically disarm the alarm at that time when that specific member arrives at the premises 300. This may or may not require facial and/or biometric identification and may be user selectable. In a similar example, if the security system 319 determines that all users of the security network routinely leave the premises 300 at 7 am, then the security system 319 may automatically arm the alarm at that time when the users leave the premises 300. Further, the security system could check internal sensors to ensure no other individuals are home at the time via internal sensors.

In some embodiments, when engaged by the user, the software application on wireless device 315 presents an initial screen or graphic on wireless device 315 relating to the security system 319. The security system 319 and software application may be configured so that initial screen presented on a user device (e.g., 315, 120, 116) is dependent on the state of the security system 319. In other words, when a user engages the software application on a user device (e.g., 315, 120, 116) the security system 319 may determine the current state of the security system 319, e.g., whether the system is armed, disarmed, in a secure state, in an unsecure states, etc. The software application on the wireless device 315 may then present a screen and/or associated graphic/video to the user depending on which state of the security system 319 is in at that time. For example, if an alarm is active, the software application on the user device (e.g., 315, 120, 116) may present the user a screen that allows the user to disarm/cancel a false alarm and/or choose the option to review the activities within the home, as depicted in FIG. 4A for example, prior to making this decision. In another example, if the security system 319 determines the premises 300 is in a secure state (e.g., armed and no active alarms), then software application on the wireless device 315 may present the user a screen that shows the current state of the home and/or allow the homeowner to view images from the active security cameras. In another example, if the security system 319 determines the premises 300 is in an unsecure state (e.g., disarmed), then software application on the user device (e.g., 315, 116, 120) may present the user a screen prompting the user to arm the security system 319.

Figure 5:
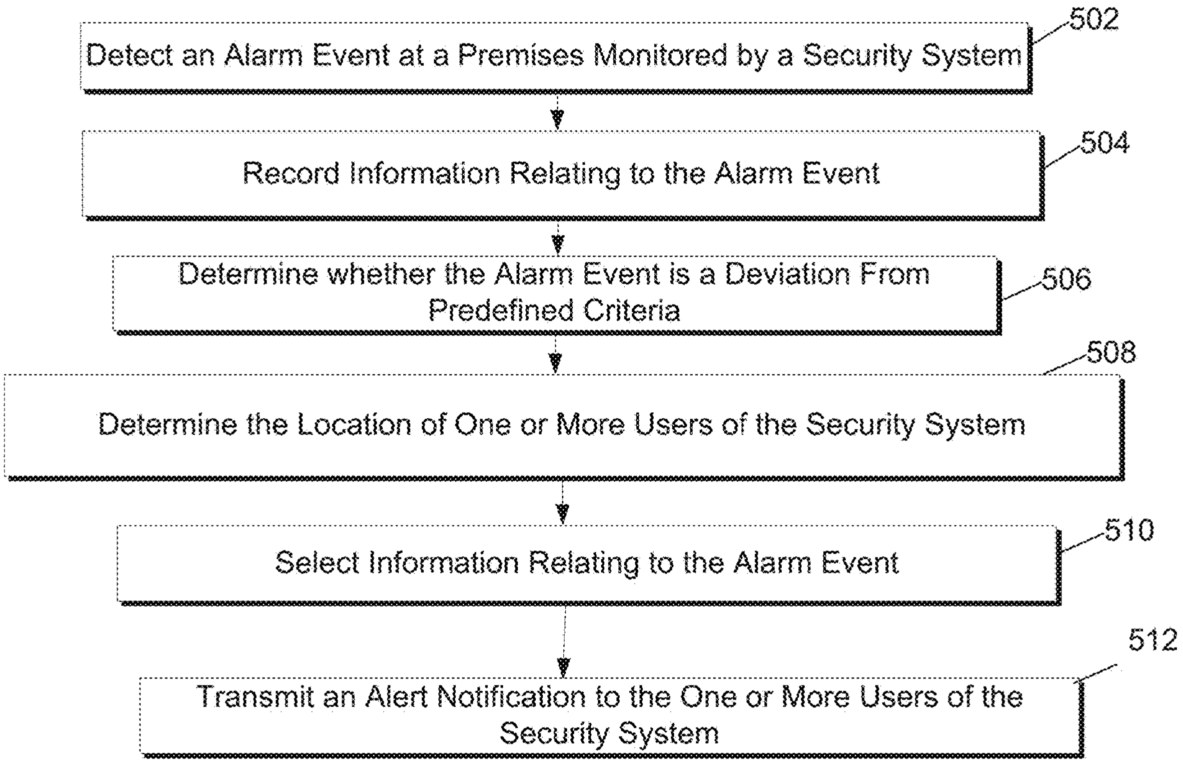
FIG. 5 is a flow chart of an algorithm that may be utilized by embodiments herein.

FIG. 5 is an exemplary flow chart outlining software process flows and associated algorithms for implementing embodiments contained herein. In one or more embodiments, the method illustrated in FIG. 5 and/or one or more steps thereof may be performed by one or more components and computing devices shown in FIGS. 1-4. The steps in this flow diagram need not all be performed in the order specified and some steps may be omitted and/or changed.

At step 502, an alarm event at a premises monitored by a security system may be detected.

At step 504, information relating to the alarm event may be recorded. For example, the security system 319 may record information identifying the sensor(s) that were tripped, their location, recording video and/or audio or other sensor data showing the event that occurred, etc.

At step 506, the security system 319 may determine whether the alarm event is a deviation from predefined criteria. Predefined criteria may include, for example, the time of day, the location of sensors within the premises 300, images on a camera, internal and/or external sensors, etc.

At step 508, the location of one or more users of the security system in relation to the premises may be determined. Methods for determining the location of or more users of the security system include, for example, using the GPS location of each user's cellular device 315, using Bluetooth or WiFi-based location, or other known methodologies.

At step 510, information relating to the alarm event may be selected. The selected information may relate, for example, to the location of one or more users of the security system, sensor data relating to the alarm event, other information relating to how the alarm event occurred, etc.

At step 512, an alert notification may be transmitted to one or more users of the security system. The alert notification may be sent, for example, if the security system 319 determines that the alarm event is a deviation from predetermined criteria. The alert notification may include information about the alarm event, such as, the location of one or more users of the security system, sensor data relating to the alarm event, information selected in step 510 relating to the alarm event, confidential information required for one or more users to terminate the alarm event, or the like.

Figure 6:
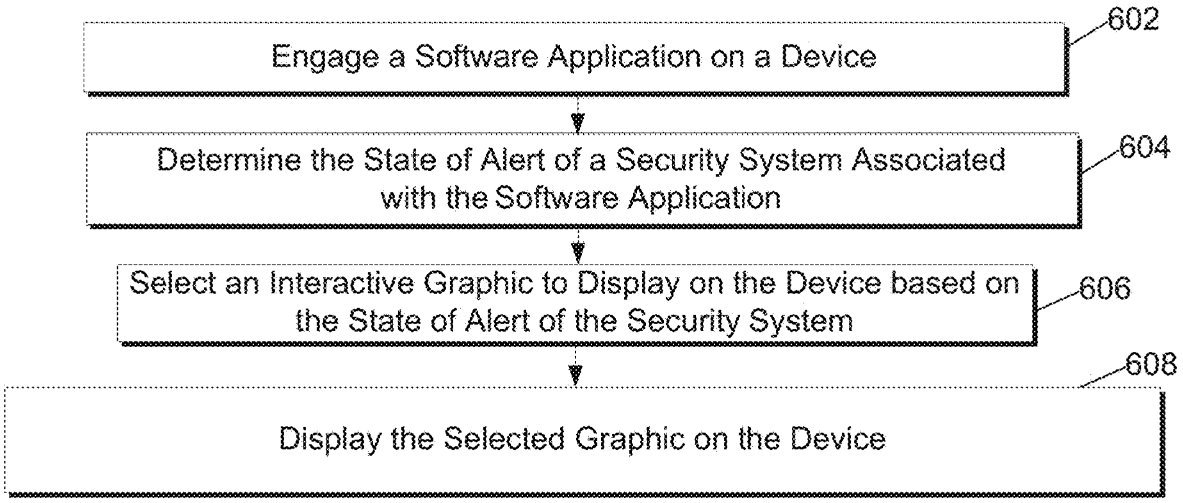
FIG. 6 is a flow chart of an algorithm that may be utilized by embodiments herein.

FIG. 6 is an exemplary flow chart outlining software process flows and associated algorithms for implementing embodiments contained herein. In one or more embodiments, the method illustrated in FIG. 6 and/or one or more steps thereof may be performed by one or more components and computing devices shown in FIGS. 1-4. The steps in this flow diagram need not all be performed in the order specified and some steps may be omitted and/or changed.

At step 602, a software application on a device may be engaged.

At step 604, the state of alert of a security system associated with the software application may be determined.

At step 606, an interactive graphic may be selected based on the state of alert of the security system.

At step 608, the selected interactive graphic may be displayed on the device.

Figure 7:
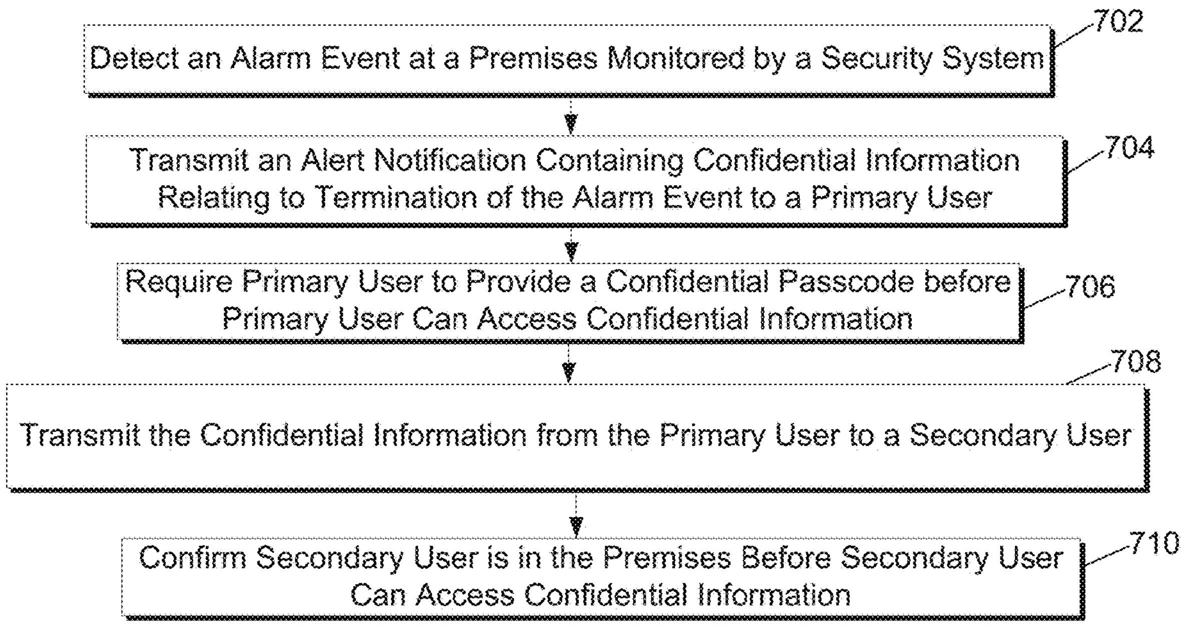
FIG. 7 is a flow chart of an algorithm that may be utilized by embodiments herein.

FIG. 7 is an exemplary flow chart outlining software process flows and associated algorithms for implementing embodiments contained herein. In one or more embodiments, the method illustrated in FIG. 7 and/or one or more steps thereof may be performed by one or more components and computing devices shown in FIGS. 1-4. The steps in this flow diagram need not all be performed in the order specified and some steps may be omitted and/or changed.

At step 702, an alarm event at a premises monitored by a security system may be detected.

At step 704, an alert notification containing confidential information related to termination of the alarm may be transmitted to a primary user of the security system. The confidential information may relate, for example, to a confidential passphrase.

At step 706, the primary user may be required to provide a confidential password before the primary user can access the confidential information required to terminate the alarm event.

At step 708, the confidential information may be transmitted from the primary user to a secondary user of the security system.

At step 710, the secondary user may be required to verify he or she is in the premises before the confidential information can be transmitted from the primary user to the secondary user.

Figure 8:
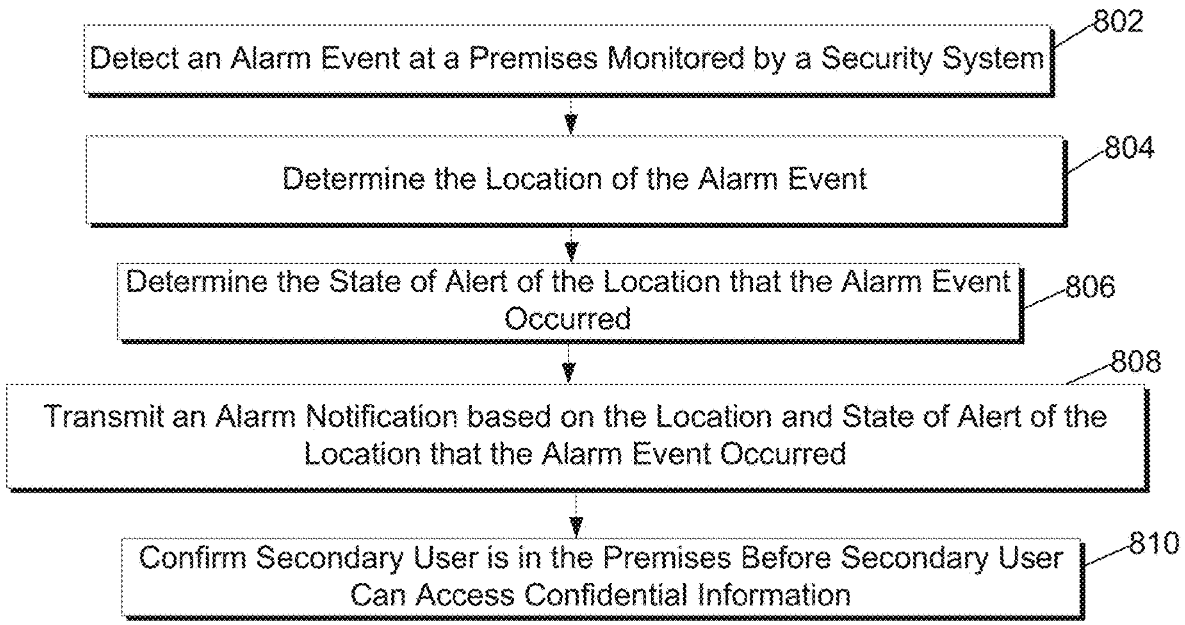
FIG. 8 is a flow chart of an algorithm that may be utilized by embodiments herein.

FIG. 8 is an exemplary flow chart outlining software process flows and associated algorithms for implementing embodiments contained herein. In one or more embodiments, the method illustrated in FIG. 8 and/or one or more steps thereof may be performed by one or more components and computing devices shown in FIGS. 1-4. The steps in this flow diagram need not all be performed in the order specified and some steps may be omitted and/or changed.

At step 802, an alarm event at a premises monitored by a security system may be detected.

At step 804, the location of the alarm event may be determined.

At step 806, the state of alertness of the location that the alarm event occurred may be determined.

At step 808, based on the location of the alarm event and the state of alert of the location where the alarm event, an alert notification to one or more users of the security system may be transmitted.

Figure 9:
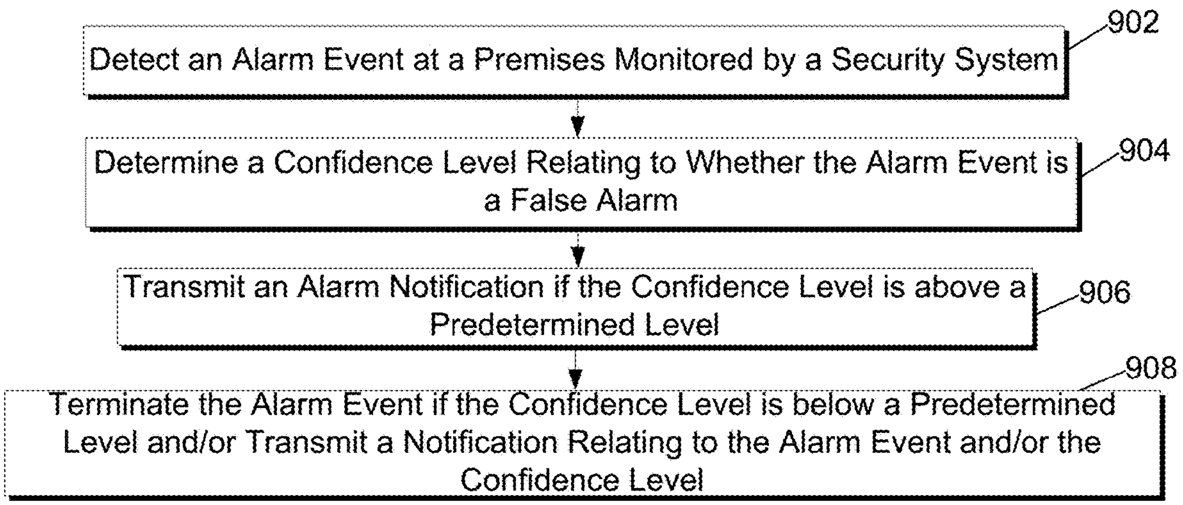
FIG. 9 is a flow chart of an algorithm that may be utilized by embodiments herein.

FIG. 9 is an exemplary flow chart outlining software process flows and associated algorithms for implementing embodiments contained herein. In one or more embodiments, the method illustrated in FIG. 9 and/or one or more steps thereof may be performed by one or more components and computing devices shown in FIGS. 1-4. The steps in this flow diagram need not all be performed in the order specified and some steps may be omitted and/or changed.

At step 902, an alarm event at a premises monitored by a security system may be detected.

At step 904, a confidence level may be determined relating to whether or not the alarm event is a false alarm.

At step 906, an alert notification may be sent to one or more users of the security system if the confidence level is above a predetermined level.

At step 908, the alarm event may be terminated if the confidence level is below a predetermined level, and a notification may be sent to one or more users providing information about the alarm event and/or the confidence level.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A computing device comprising:
one or more processors; and
memory storing instructions that, when executed by the one or more processors, cause the computing device to:
determine an association between:
a first sensor within a first zone of a plurality of zones associated with a premises monitored by a security system, and
a second sensor within a second zone of the plurality of zones;
detect a tripped state of the first sensor within the first zone;
cause, based on the second sensor within the second zone being tripped while armed, based on determining that the tripped state of the first sensor occurred before the second sensor was tripped, and based on the association, triggering of an alarm of the security system; and
send, to a user device associated with the security system and based on the triggering of the alarm, an alert notification indicating a location of one or more users associated with the security system.

2. The computing device of claim 1, wherein the instructions, when executed by the one or more processors, cause the computing device to cause the triggering of the alarm further based on determining that a time at which a previous alarm was triggered is before a time associated with the tripped state of the first sensor.

3. The computing device of claim 1, wherein the instructions, when executed by the one or more processors, further cause the computing device to:
determine a location, in relation to the premises, of the first sensor, wherein the instructions, when executed by the one or more processors, cause the computing device to cause the triggering of the alarm further based on the location.

4. The computing device of claim 1, wherein the instructions, when executed by the one or more processors, further cause the computing device to:
determine, based on a behavioral pattern of a user associated with the security system, the plurality of zones associated with the premises.

5. The computing device of claim 1, wherein the second sensor was armed based on determining that a previous alarm was triggered.

6. The computing device of claim 1, wherein the alert notification further comprises one or more of:
a description of an event associated with the tripped state of the first sensor within the first zone;
an instruction to stay away from the premises until the tripped state of the first sensor within the first zone is changed; or
information that facilitates access to a confidential passphrase for changing a state of the security system.

7. The computing device of claim 1, wherein the instructions, when executed by the one or more processors, further cause the computing device to determine the association by causing the computing device to receive instructions to adjust, based on a tripped state of one or more sensors within the first zone of the plurality of zones, an alert state of one or more sensors within the second zone of the plurality of zones.

8. One or more non-transitory computer-readable media storing instructions that, when executed, cause:
determining, by a computing device, an association between:
a first sensor within a first zone of a plurality of zones associated with a premises monitored by a security system, and
a second sensor within a second zone of the plurality of zones;
detecting a tripped state of the first sensor within the first zone;
causing, based on the second sensor within the second zone being tripped while armed, based on determining that the tripped state of the first sensor occurred before the second sensor was tripped, and based on the association, triggering of an alarm of the security system; and
sending, to a user device associated with the security system and based on the triggering of the alarm, an alert notification indicating a location of one or more users associated with the security system.

9. The non-transitory computer-readable media of claim 8, wherein the instructions, when executed, cause the causing the triggering of the alarm further based on determining that a time at which a previous alarm was triggered is before a time associated with the tripped state of the first sensor.

10. The non-transitory computer-readable media of claim 8, wherein the instructions, when executed, further cause:

determining a location, in relation to the premises, of the first sensor, wherein the causing the triggering of the alarm is further based on the location.

11. The non-transitory computer-readable media of claim 8, wherein the instructions, when executed, further cause:

determining, based on a behavioral pattern of a user associated with the security system, the plurality of zones associated with the premises.

12. The non-transitory computer-readable media of claim 8, wherein the second sensor was armed based on determining that a previous alarm was triggered.

13. The non-transitory computer-readable media of claim 8, wherein the alert notification further comprises one or more of:

a description of an event associated with the tripped state of the first sensor within the first zone;

an instruction to stay away from the premises until the tripped state of the first sensor within the first zone is changed; or information that facilitates access to a confidential passphrase for changing a state of the security system.

14. The non-transitory computer-readable media of claim 8, wherein the instructions, when executed, cause the determining the association by causing receiving instructions to adjust, based on a tripped state of one or more sensors within the first zone of the plurality of zones, an alert state of one or more sensors within the second zone of the plurality of zones.

15. A system comprising:

a computing device; and a security system, wherein the computing device is configured to:

determine an association between:

a first sensor within a first zone of a plurality of zones associated with a premises monitored by the security system, and a second sensor within a second zone of the plurality of zones;

detect a tripped state of the first sensor within the first zone;

cause, based on the second sensor within the second zone being tripped while armed, based on determining that the tripped state of the first sensor occurred before the second sensor was tripped, and based on the association, triggering of an alarm of the security system; and send, to a user device associated with the security system and based on the triggering of the alarm, an alert notification indicating a location of one or more users associated with the security system; and wherein the security system is configured to:

trigger the alarm.

16. The system of claim 15, wherein the computing device is configured to cause the triggering of the alarm further based on determining that a time at which a previous alarm was triggered is before a time associated with the tripped state of the first sensor.

17. The system of claim 15, wherein the computing device is further configured to:

determine a location, in relation to the premises, of the first sensor, wherein the computing device is configured to cause the triggering of the alarm further based on the location.

18. The system of claim 15, wherein the computing device is further configured to:

determine, based on a behavioral pattern of a user associated with the security system, the plurality of zones associated with the premises.

19. The system of claim 15, wherein the second sensor was armed based on determining that a previous alarm was triggered.

20. The system of claim 15, wherein the alert notification further comprises one or more of:

a description of an event associated with the tripped state of the first sensor within the first zone;

an instruction to stay away from the premises until the tripped state of the first sensor within the first zone is changed; or information that facilitates access to a confidential passphrase for changing a state of the security system.

* * * * *